United States Patent

Corry

[11] 3,919,619
[45] Nov. 11, 1975

[54] APPARATUS FOR GENERATING THREE-PHASE SINUSOIDAL VOLTAGES

[75] Inventor: Thomas M. Corry, Goleta, Calif.

[73] Assignee: General Motors Corporation, Detroit, Mich.

[22] Filed: June 5, 1974

[21] Appl. No.: 476,695

[52] U.S. Cl................ 321/5; 321/9 R; 321/DIG. 1; 323/43.5 S
[51] Int. Cl. ......................................... H02m 7/52
[58] Field of Search ............... 321/5, 9 R, 45 C, 47; 323/91, 50, 43.5 S; 328/186

[56] References Cited
UNITED STATES PATENTS

| | | | |
|---|---|---|---|
| 3,725,767 | 4/1973 | Corry | 321/5 |
| 3,781,635 | 12/1973 | Sauer | 321/9 R |
| 3,829,736 | 8/1974 | Schirman | 323/50 |

*Primary Examiner*—Gerald Goldberg
*Attorney, Agent, or Firm*—Howard N. Conkey

[57] ABSTRACT

Apparatus for inverting input DC source voltage to generate three-phase, sine-wave, line-to-line output voltages. A first inverter produces three-phase, flat-top, full-wave voltages in relation to a point of reference potential on three-phase output conductors and a second inverter operating in synchronism with the first inverter generates a single-phase, flat-top voltage at three times the frequency of the output of the first inverter. A transformer having a plurality of voltage taps is coupled between the point of reference potential and the second inverter. First and second banks of voltage level selector controlled rectifiers are coupled to the voltage taps and are selectively gated to produce alternate pairs of stepped ascending and descending voltages which are selectively coupled to the three phase output conductors by voltage distributors to complement the three-phase, flat-top, full-wave voltages to complete the line-to-neutral, three-phase waveforms. These waveforms combine to form three-phase, line-to-line voltages. The voltage level selector controlled rectifiers which are commutated naturally during generation of the stepped voltages are coupled directly to the voltage distributors and the voltage level selector controlled rectifiers which require auxiliary commutation are coupled to the voltage distributors through commutating switches. Current flow through the commutating switches is reduced by capacitors coupled across the three-phase output conductors to provide for a leading load power factor. The capacitor values may be selected so as to reduce the current through the commutating switches to zero for all expected load conditions to thereby allow the elimination of the commutating switches and the level selector controlled rectifiers coupled thereto.

2 Claims, 4 Drawing Figures

APPARATUS FOR GENERATING THREE-PHASE SINUSOIDAL VOLTAGES

The invention herein described was made in the course of work under contract or subcontract thereunder with the Department of Defense.

This invention relates to an improved apparatus for producing a set of three sine-wave, line-to-line voltages from a set of three non-sine, line-to-neutral voltages each having a substantially flat-top power center portion and a plurality of rising and falling voltage steps outboard the flat-top portion.

The form of three-phase sinusoidal voltage generator to which this invention is directed is described in my U.S. Pat. No. 3,725,767 which issued on Apr. 3, 1973, the contents of which are hereby incorporated by reference. The generator described therein supplies substantially sine-wave, three-phase, line-to-line output voltages by generating three sets of line-to-neutral voltages displaced by 120° from one another, each comprised substantially of flat-top centers combined with stepped ascending or descending voltages. The stepped ascending and descending voltages were generated by means of a transformer having a plurality of voltage taps across which the output of a single phase, flat top voltage is applied. First and second banks of stepped level selector switches were provided to sequentially couple the taps of the transformer in ascending or descending order through commutating switches to a voltage distributor to produce the stepped ascending or descending voltages. Each of the voltage level selector switches were comprised of controlled rectifiers each of which coupled a tap on the transformemr to the output of the apparatus through a commutating switch. As such, all of the current through the voltage level selector switches passed through the commutating switches. Although this approach is a valuable and reliable method of generating three-phase, line-to-line power, the total output power of the apparatus is limited by the current rating of the commutating switches.

In accordance with one aspect of this invention, the controlled rectifiers in the voltage level selector switches in the aforementioned type of inverter which are naturally commutated during generation of the stepped ascending and descending voltages are coupled directly to the voltage distributors and the controlled rectifiers requiring auxiliary commutation are coupled to the voltage distributors through commutating switches. Further, capacitors are coupled across the output conductors of the apparatus to provide for a leading load power factor to decrease the percentage of the total load current carried by the commutating switches.

In another aspect of this invention, the capacitors coupled across the load conductors are such that all of the load current passes through controlled rectifiers in the voltage level selector switches which are naturally commutated.

It is the object of this invention to provide an inverter of the type described in my U.S. Pat. No. 3,725,767 having improved power output capability and having fewer circuit components.

The invention may be best understood by reference to the following description, taken in connection with the accompanying drawings, in which.

Figure 1:
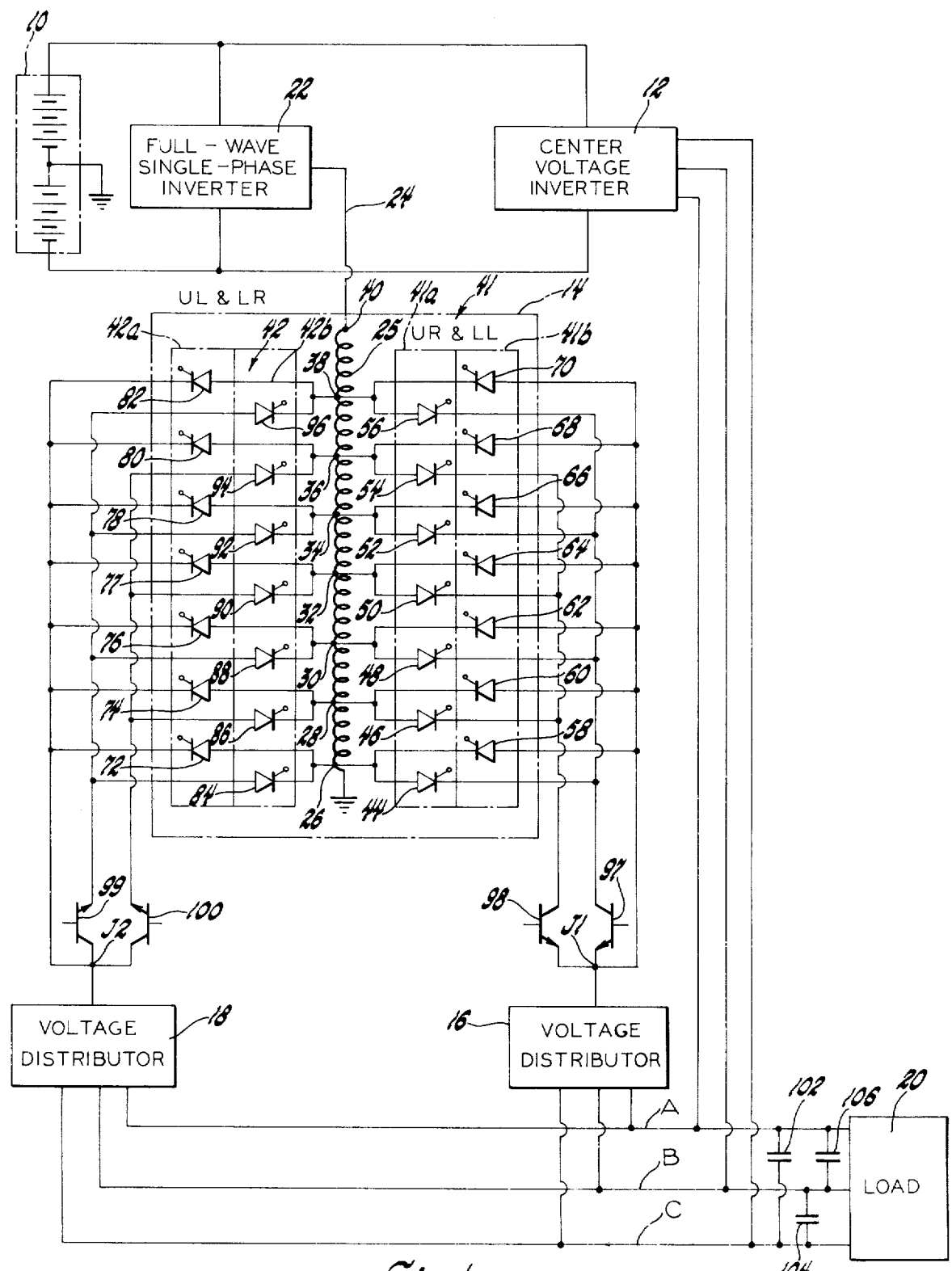
FIG. 1 is a diagram of the apparatus for generating voltages in accordance with the present invention.
Figure 3:
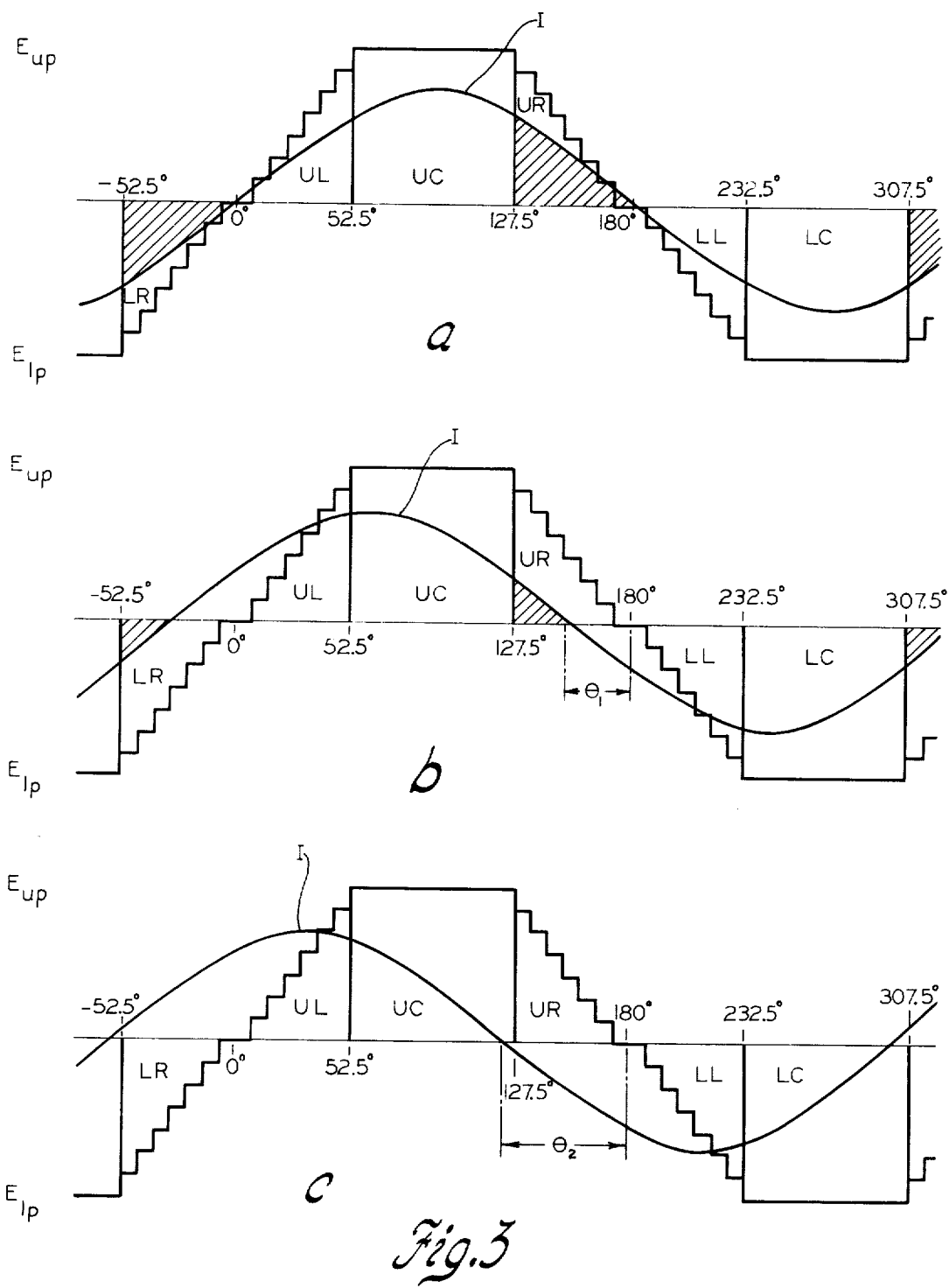
Figure 4:
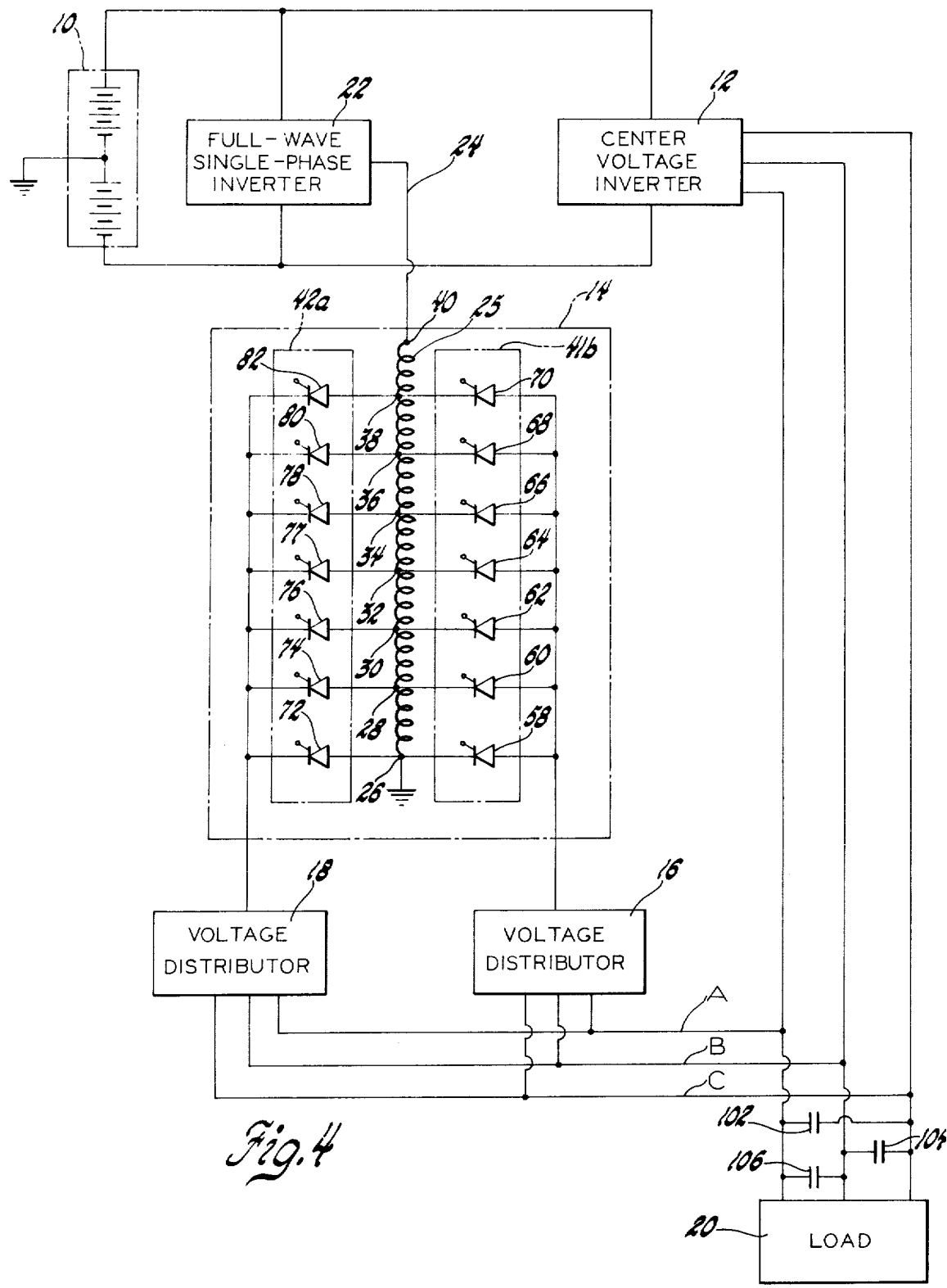

FIG. 3 is a diagram illustrating one of the line-to-neutral voltage and current waveforms with three different load power factors and the resulting effect on the current through commutating switches; and FIG. 4 is a circuit diagram illustrating the simplification of the circuit of FIG. 1 when the load line-to-neutral voltage phase relationship is such that all of the current from the ascending and descending voltage generator passes through controlled rectifiers having natural commutation.

Referring to FIG. 1, a unidirectional power source indicated at 10, is a source of substantially constant potential having a center tap coupled to a point of reference potential indicated as ground. A center voltage inverter 12 is coupled across the source 10 and applies three-phase line-to-neutral flat-top voltage pulses directly from the source 10 to three output lines A, B and C. These voltage pulses are shown as UC (upper center) and LC (lower center) in the respective line-to-neutral voltage shown in FIG. 2. These voltage pulses are hereinafter referred to as the upper center and lower center voltage pulses and, alternatively, as the line-to-neutral waveform power center. The center voltage inverter 12 is described in detail in the aforementioned U.S. Pat. No. 3,725,767.

The three-phase line conductors A, B and C receive left/right voltages from the source 10 through a left/right or ascending and descending voltage generator or inverter 14 and voltage distributors 16 and 18. The inverter 14 produces the increasing and decreasing voltage waves LL (lower left), UL (upper left), LR (lower right), and UR (upper right) of the three line-to-neutral voltages illustrated in FIG. 2 and the voltage distributors 16 and 18 switch the respective voltages to the appropriate line conductors A, B and C to construct the respective line-to-neutral voltages illustrated in FIG. 2. The voltage distributors 16 and 18 are described in detail in the aforementioned U.S. Pat. No. 3,725,767.

Figure 2:
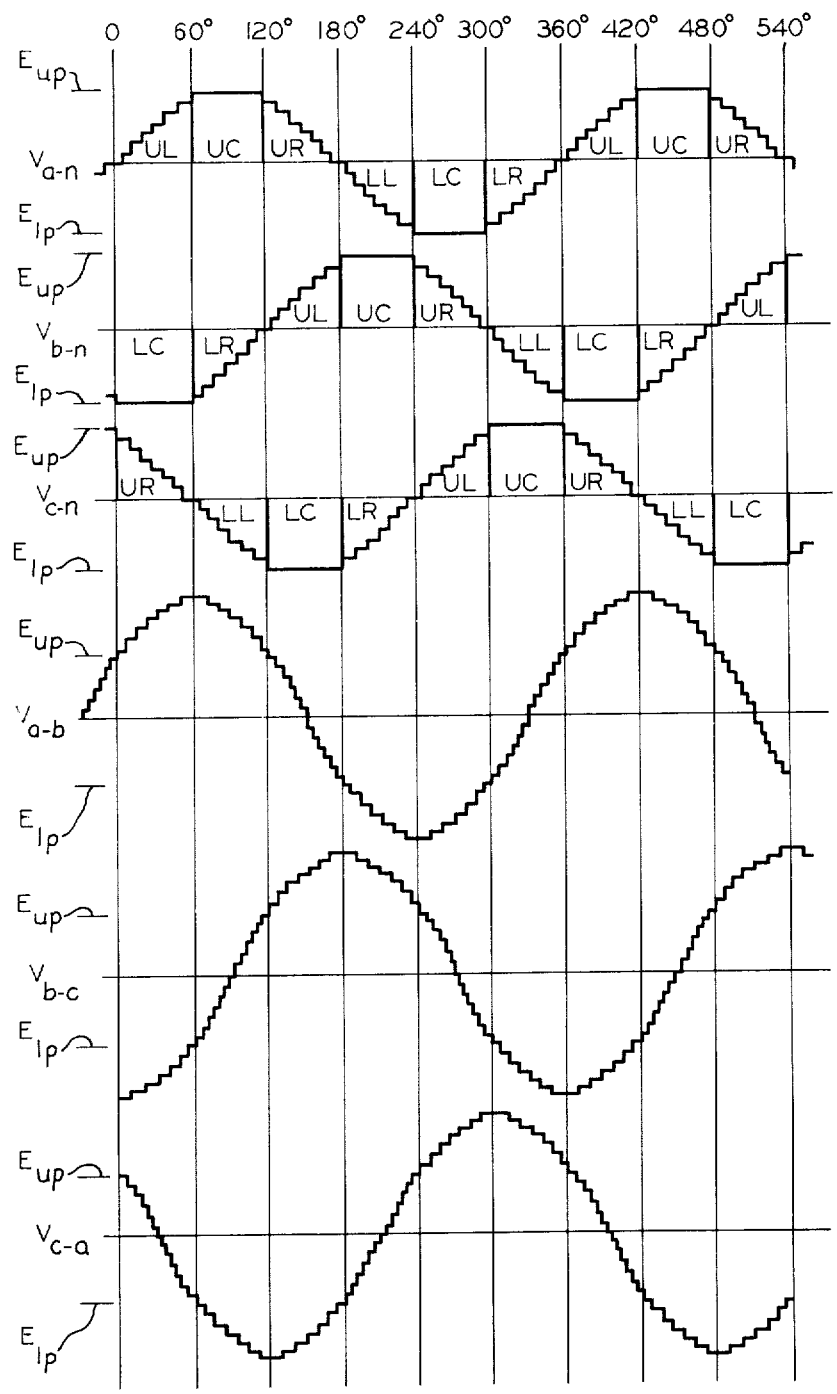
FIG. 2 is a diagram showing three line-to-neutral and three line-to-line voltages generated in accordance with this invention.

Respective pairs of the line-to-neutral voltages $V_{a-n}$, $V_{b-n}$ and $V_{c-n}$ in FIG. 2 are combined to produce the line-to-line voltages $V_{a-b}$, $V_{b-c}$ and $V_{c-a}$. These line-to-line voltages are coupled to a load 20 which may be a delta or Y-connected load.

Referring to FIG. 2, in the flat-top, line-to-neutral voltage waveforms $V_{a-n}$, $V_{b-n}$ and $V_{c-n}$, each cycle of each of the three line-to-line voltage waveforms includes an upper center waveform portion UC, an upper right waveform portion UR, a lower left waveform portion LL, a lower center waveform portion LC, and a lower right waveform portion LR. These waveform portions are of approximately equal duration, each extending over approximately 60 electrical degrees in each cycle of the respective line-to-neutral waveforms. It is understood, however, that the voltage portions UC and LC may be of greater duration than the 60° illustrated in FIG. 2 with a resulting decrease in the duration of the stepped voltage portions UL, UR, LL and LR.

The upper center waveform portion UC is defined by an upper center voltage segment which is substantially constant at a potential $E_{up}$. Similarly, the lower center waveform portion LC is defined by a lower center voltage segment which is substantially constant at a lower potential $E_{lp}$. The upper left waveform portion UL is defined by an upper left voltage segment which ascends in a series of voltage steps from the neutral potential to the upper potential $E_{up}$. The upper right waveform portion UR is defined by an upper right voltage segment which descends in a series of voltage steps from the upper potential $E_{up}$ to the neutral potential. The lower left waveform portion LL is defined by a lower left voltage segment which descends in a series of voltage steps from the neutral potential to the lower potential $E_{lp}$. The lower right waveform portion is defined by a lower right voltage segment which ascends in a series of voltage steps from the lower potential $E_{lp}$ to the neutral potential.

Referring to FIGS. 1 and 2, as previously indicated, the center voltage generator 12 alternately provides the positive and negative power center voltage portions. The frequency of these portions is three times the preselected operating frequency of the line-to-line voltage waveforms $V_{a-b}$, $V_{b-c}$ and $V_{c-a}$. These voltage portions are distributed in sequence as the portions UC and LC to their respective phases as illustrated in FIG. 2. The left/right or ascending and descending voltage generator 14 alternately produces the simultaneous upper left and right voltage waveform portions UL and UR and the simultaneous lower left and right voltage waveform portions LL and LR at three times the frequency of the line-to-neutral voltage waveforms $V_{a-b}$, $V_{b-c}$ and $V_{c-a}$. The voltage distributors 16 and 18 apply the upper left and right voltage portions UL and UR and the lower left and right voltage portions LL and LR of FIG. 2 to the phase lines A, B and C.

The ascending and descending voltages are derived from the unidirectional power source 10 via a flat-top, full-wave, signal phase inverter 22 which is described in detail in my aforementioned U.S. Pat. No 3,725,767. The inverter 22 operates in timed relationship with the center voltage inverter 12 to produce square-wave drive voltage pulses on an output line 24 which alternates between the upper potential $E_{up}$ and the lower potential $E_{lp}$ three times for each cycle of the line-to-line voltage waveforms $V_{a-b}$, $V_{b-c}$, and $V_{c-a}$.

The ascending and descending voltage generator 14 includes a voltage reference device or autotransformer 25 coupled between ground potential and the output line 24 of the inverter 22. The autotransformer 25 includes a multiplicity of voltage taps 26, 28, 30, 32, 34, 36, 38 and 40 wherein the tap 40 is connected with the inverter output line 24 and the tap 26 is connected to ground. Thus in operation, the autotransformer 25 is subject to alternate positive and negative voltages at the respective potentials $E_{up}$ and $E_{lp}$ from the power source 10 applied through conductor 24 to tap 40. This alternating voltage causes the flux linking the winding of the autotransformer 25 to alternate substantially at the rate of the applied voltage between the taps 26 and 40. As a consequence, the taps 26, 28, 30, 32, 34, 36 and 38 aubstantially divide the total applied voltage in accordance with their proportionate turns in accordance with conventional transformer action. The taps 26 through 38 are spaced so that each is at a specific one of the stepped levels of the waveform portions UR or UL of FIG. 2 when the drive voltage at the input tap 40 is at the upper potential $E_{up}$ and at one of the lower step levels of the waveform portions LR or LL of FIG. 2 when the drive voltage at the input tap 40 is at the lower potential $E_{lp}$.

The ascending and descending voltage generator 14 further includes a first bank of voltage level selector switches 41 for generating the waveform portions UR and LL and a second bank of voltage level selector switches 42 for generating the waveform portions UL and LR. The banks of voltage level selector switches 41 and 42 function to generate the waveform portions UR, UL, LL and LR of FIG. 2 by sequentially coupling the taps 26 through 38 in ascending and descending order to the voltage distributors 16 and 18.

The bank of voltage level selector switches 41 includes a group of controlled rectifiers 41a comprises of controlled rectifiers 44, 46, 48, 50, 52, 54 and 56, having their anodes coupled to the taps 26, 28, 30, 32, 34, 36 and 38, respectively, to conduct positive load current and a group of controlled rectifiers 41b comprises of controlled rectifiers 58, 60, 62, 64, 66, 68 and 70 having their cathodes coupled to the taps 26, 28, 30, 32, 34, 36 and 38, respectively, to conduct negative load current. The bank of voltage level selector switches 42 includes a group of controlled rectifiers 42a comprised of controlled rectifiers 72, 74, 76, 77, 78, 80 and 82 having their anodes coupled to the taps 26, 28, 30, 32, 34, 36, and 38, respectively, to conduct positive load current and a group of controlled rectifiers 42b comprised of controlled rectifiers 84, 86, 88, 90, 92, 94 and 96 having their cathodes coupled to the taps 26, 28, 30, 32, 34, 36 and 38, respectively, to conduct negative load current.

The controlled rectifiers in groups 41a and 42b require auxiliary commutation as will be described. To provide for commutation, the cathodes of the alternate controlled rectifiers 44, 48, 52 and 56 are coupled to a junction point J1 at the input of the voltage distributor 16 through a commutating transistor 97, the cathodes of the alternate controlled rectifiers 46, 50 and 54 are coupled to the junction point J1 through a commutating transistor 98, the anodes of the alternate controlled rectifiers 84, 88, 92 and 96 are coupled to a junction point J2 at the input of the voltage distributor 18 through a commutating transistor 99 and the anodes of the alternate controlled rectifiers 86, 90 and 94 are coupled to the junction point J2 through a commutating transistor 100.

The controlled rectifiers in group 41b are naturally commutated as will be described and their anodes are coupled together and directly to the junction point J1 at the input of the voltage distributor 16. Also, the controlled rectifiers in group 42a are naturally commutated as will be described and their cathodes are coupled together and directly to the junction point J2 at the input of the voltage distributor 18.

In the following description, a controlled rectifier or a transistor is gated when a bias signal is applied to the control electrode thereof. Further, the pair of controlled rectifiers in the bank of voltage level selector switches 41 coupled to a common voltage tap of the autotransformer 25 are simultaneously gated, the pair of controlled rectifiers in the bank of voltage selector switches 42 coupled to a common voltage tap of the autotransformer 25 are simultaneously gated and each of the transistors 97 through 100 is simultaneously gated with the controlled rectifiers coupled therewith.

The controlled rectifiers in groups 41a, 41b, 42a and 42b and the transistors 97 through 100 are selectively gated to generate the ascending and descending waveform portions UL, UR, LL and LR by sequentially coupling the voltage at the taps 26 through 38 to the voltage distributor 16 and 18 in respective ascending and descending order. As previously indicated, these waveform portions are coupled to the output lines A, B, and C by the voltage distributors 16 and 18 in synchronism with the ouput of the center voltage inverter 12 so as to generate the line-to-line waveforms illustrated in FIG. 2.

When the cathodes of a pair of controlled rectifiers are coupled, positive current flow may be transferred from the controlled rectifier having an anode voltage at one potential to the controlled rectifier having an anode voltage at a more positive potential, whether both anode voltages are positive or negative, by gating the latter which reverse biases and commutates the former. Therefore, it can be seen that by generating the upper left waveform portion UL when the drive voltage is at the upper potential $E_{up}$ and the lower right waveform portion LR when the drive voltage is at the lower potential $E_{lp}$ with the controlled rectifiers in groups 42a and 42b, the controlled rectifiers in group 42a are commutated naturally when the load current is positive. For example, assuming the controlled rectifier 74 gated and conducting positive load current and the drive voltage at the upper potential $E_{up}$, gating of the controlled rectifier 76 reverse biases and commutates the controlled rectifier 74 to successfully transfer positive load current to the controlled rectifier 76. In like manner, if the drive voltage is at the lower potential $E_{lp}$ and the controlled rectifier 82 is gated and conducting positive load current, the gating of controlled rectifier 80 reverse biases and commutates the controlled rectifier 82 to successfully transfer positive load current to the controlled rectifier 80.

If the load current is negative during generation of the waveform portions UL and LR, current flows through the controlled rectifiers 84 through 96 in group 42b and auxiliary commutation is required. This is provided by the commutating transistors 99 and 100 which commutates the controlled rectifiers by current starvation.

When the anodes of a pair of controlled rectifiers are coupled, negative current flow may be transferred from the controlled rectifier having a cathode voltage at one potential to the controlled rectifier having a cathode voltage at a more negative potential, whether both cathode voltages are positive or negative, by gating the latter which reverse biases and commutates the former. Therefore, it can be seen that by generating the upper right waveform portion UR when the drive voltage is at the upper potential $E_{up}$ and the lower left waveform portion LL when the drive voltage is at the lower potential $E_{lp}$ with the controlled rectifiers in groups 41a and 41b, the controlled rectifiers in group 41b are commutated naturally when the load current is negative. For example, assuming controlled rectifier 70 gated and conducting negative load current and the drive voltage at the upper potential $E_{up}$, gating of the controlled rectifier 68 reverse biases and commutates the controlled rectifier 70 to successfully transfer the negative load current to the controlled rectifier 68. In like manner, if the drive voltage is at the lower potential $E_{lp}$ and the controlled rectifier 58 is gated, gating of controlled rectifier 60 reverse biases and commutates the controlled rectifier 58 to successfully transfer negative load current to the controller rectifier 60.

If the load current is positive during generation of the waveform portions UR and LR, current flows through the controlled rectifiers 44 through 56 in group 41a and auxiliary commutation is required. This is provided by the commutating transistors 97 and 98 which commutate the controlled rectifiers by current starvation.

Referring to FIG. 3a, there is illustrated one of the three generated line-to-neutral voltage waveforms having a 75° power center on output conductors A, B or C and the resulting load current I when the load 20 has a power factor of unity resulting in a zero phase shift between the load voltage and current waveforms. The shaded portion of the load current I represents that portion which is required to flow through the commutating transistors 97 through 100 and the unshaded portion represents the current flowing through the controlled rectifiers in groups 41b and 42a and the center voltage inverter 12.

Referring to FIG. 3b, there is illustrated the same voltage and current waveforms as in FIG. 3a when the load power factor is such that the current I leads the voltage waveform by and angle $52.5° > |\theta_1| > 0$. As can be seen, the shaded portion representing the portion of the load current required to flow through the commutating switches 97 through 100 is decreased.

When the load power is such that the current I leads the voltage by an angle $\theta_2$ equal to or greater than the width of the wave form portions LR, UL, UR and LL, no load current passes through the commutating transistors 97 through 100 and all of the load current passes through the controlled rectifiers in groups 42a and 41b which are naturally commutated. In the waveform illustrated in FIG. 3, this angle is 52.5°. In each of the examples illustrated in FIGS. 3b and 3c, the power handling capabilities of the apparatus of FIG. 1 is improved as the percentage of the total load current required to be handled by the commutating transistors 97 through 100 is decreased. To assure that each of the line-to-neutral currents on lines A, B and C leads the line-to-neutral voltages generated thereon, capacitors 102, 104 and 106 are coupled respectively line-to-line between the output lines A, B and C to provide for a leading power factor to decrease the current flowing through the transistors 97 through 100.

As illustrated in FIG. 3c, the current required to flow through commutating switches having power limitations can be completely eliminated if the line-to-neutral load current leads the line-to-neutral voltage by an angle of $\theta_2$ which is equal to or greater than the width of the stepped waveform portions LR, UL, UR and LL. As indicated, in the specific waveform illustrated in FIG. 3, the power center portions UC and LC have a width of 75 electrical degrees and each of the waveform portions LR, UL, UR and LL have a width equal to 52.5 electrical degrees. Therefore, by assuring that the phase angle $\theta_2$ is equal to or greater than 52.5 electrical degrees, all of the load current flows through the controlled rectifiers in groups 41b and 42a which have natural commutation. By proper selection of the capacitors 102, 104 and 106 for all anticipated load conditions, the required phase shift as illustrated in FIG. 3c may be assured. Consequently, the circuit of FIG. 1 may be simplified as illustrated in FIG. 4 wherein the controlled rectifiers and commutating switches are eliminated and only controlled rectifiers having natural commutation are required. The circuit illustrated in FIG. 4 eliminates a significant number of circuit elements and further provides for improved power handling capabilities of the inverter by eliminating commutating switches having power limitations.

The commutation of controlled rectifiers in the center voltage inverter 12, timing diagrams and gate signal generation are described in my U.S. Pat. No. 3,725,767 to which reference may be made for their details.

The description of a preferred embodiment of the invention for the purpose of illustrating the invention is not to be considered as limiting the invention as many modifications can be made by the exercise of skill in the art without departing from the scope of the invention.

What is claimed is:

1. A three-phase inverter effective to generate three-phase substantially sine-wave voltages across a set of three line conductors comprising: a unidirectional voltage source having a center tap at a neutral potential; a three-phase inverter means connected between the voltage source and the line conductors for producing three-phase, flat-top, full-wave voltages on the respective line conductors in relation to the center tap; a second inverter means connected to said source and operable to produce a single-phase, flat-top voltage signal alternating between an upper potential and a lower potential at a predetermined frequency; an inductor having a plurality of taps; means for coupling said inductor between said second inverter means and the center tap of the voltage source, whereby flat-top voltage excitation alternating between the upper and lower potential appears thereacross at the predetermined frequency; a first group of controlled rectifiers having their anodes coupled to respective taps of the inductor and their cathodes coupled to a first junction point; a second group of controlled rectifiers having their cathodes coupled to respective taps of the inductor and their anodes coupled to a second junction point; means for selectively gating the controlled rectifiers in the first group to couple the taps of the inductor to the first junction point in ascending order when the excitation across the conductor is at the upper potential to generate a stepped upper left waveform portion and in descending order when the excitation across the conductor is at the lower potential to generate a stepped lower right waveform portion; means for selectively gating the controlled rectifiers in the second group to couple the taps of the inductor to the second junction point in descending order when the excitation across the inductor is at the upper potential to generate a stepped upper left waveform portion and in ascending order when the excitation across the inductor is at the lower potential to generate a stepped lower left waveform portion; means for coupling the upper left, upper right, lower left and lower right stepped waveform portions to the three line conductors in timed relation to the three-phase, flat-top, full-wave voltages to approximate a balanced and symmetrical line-to-neutral voltage on each line conductor; a load coupled to the three line conductors; and capacitor means coupled between respective lines of the three line conductors to provide for a line-to-neutral current on each line conductor which leads the approximated balanced and symmetrical line-to-neutral voltage on the respective line conductor by an angle at least equal to the width of the stepped waveform portions.

2. A three phase inverter effective to generate three-phase substantially sine-wave voltages across a set of three line conductors comprising: a unidirectional voltage source having a center tap at a neutral potential; a three-phase inverter means connected between the voltage source and the line conductors for producing three-phase, flat-top, full-wave voltages on the respective line conductors in relation to the center tap; a second inverter means connected to said source and operable to produce a single-phase, flat-top voltage signal alternating between an upper potential and a lower potential at a predetermined frequency; an inductor having a plurality of taps; means for coupling said inductor between said second inverter means and the center tap of the voltage source, whereby flat-top voltage excitation alternating between the upper and lower potential appears thereacross at the predetermined frequency; a first bank of voltage level selector switches including a first group of controlled rectifiers having their anodes coupled to respective taps of the inductor and their cathodes coupled to a first junction point and a second group of controlled rectifiers having their cathodes coupled to respective taps of the inductor; a second bank of voltage level selector switches including a third group of controlled rectifiers having their cathodes coupled to respective taps of the inductor and their anodes coupled to a second junction point and a fourth group of controlled rectifiers having their anodes to respective taps of the inductor; first commutating switch means coupled between the anodes of the second group of controlled rectifiers and the first junction point; second commutating switch means coupled between the cathodes of the fourth group of controlled rectifiers and the second junction point; means for selectively gating the controlled rectifiers in the first and second groups and the first commutating switch means to couple the taps of the inductor to the first junction point in ascending order when the excitation across the conductor is at the upper potential to generate a stepped upper left waveform portion and in descending order when the excitation across the conductor is at the lower potential to generate a stepped lower right waveform portion; means for selectively gating the controlled rectifiers in the third and fourth groups to couple the taps of the inductor to the second junction point in descending order when the excitation across the inductor is at the upper potential to generate a stepped upper left waveform portion and in ascending order when the excitation across the inductor is at the lower potential to generate a stepped lower left waveform portion; means for coupling the upper lef, upper right, lower left and lower right stepped waveform portions to the three line conductors in timed relation to the three-phase, flat-top, full-wave voltages to approximate a balanced and symmetrical line-to-neutral voltage on each line conductor; a load coupled to the three line conductors; and capacitor means coupled between respective lines of the three line conductors to provide for a leading load current.

* * * * *